United States Patent [19]
Tsuchida et al.

[11] Patent Number: 5,843,310
[45] Date of Patent: Dec. 1, 1998

[54] FILTER UNIT FOR FILTER PRESS

[75] Inventors: Kunihiko Tsuchida, Zentsuji; Kazuhisa Otani, Marugame, both of Japan

[73] Assignee: Ishigaki Company Limited, Tokyo, Japan

[21] Appl. No.: 779,795

[22] Filed: Jan. 7, 1997

[30] Foreign Application Priority Data

Jan. 10, 1996 [JP] Japan .................................. 8-261033

[51] Int. Cl.⁶ .................................................. B01D 25/34
[52] U.S. Cl. .......................... 210/225; 210/229; 210/230
[58] Field of Search .................................. 210/225, 229, 210/230; 100/198

[56] References Cited

U.S. PATENT DOCUMENTS 4,900,454  2/1990  Hedlund et al. ......................... 210/230
5,167,801  12/1992  Kawasaki ................................ 210/225

*Primary Examiner*—Matthew O. Savage
*Attorney, Agent, or Firm*—McDonnell Boehnen Hulbert & Berghoff

[57] ABSTRACT

Since a filter unit is formed by causing an upper portion support bar for a filter cloth put on a filtering surface of a filter plate to be engaged to a washing pipe integrally provided for the filter plate, a filtering mechanism portion of a filter press can easily be formed by mounting the filter units by a predetermined number. Moreover, the operation control and maintenance of the filter press can easily be performed.

4 Claims, 15 Drawing Sheets

FILTER UNIT FOR FILTER PRESS

BACKGROUND OF THE INVENTION

The present invention relates to an improvement in a filter unit for use in a filter press, and more particularly to a filter unit which is assembled as a unit on the outside of the main body of the filter press so as to be attached to the main body so that the filtering portion is easily be formed and which can easily be maintained and inspected.

Hitherto, a filter unit for a filter press similar to that according to the present invention has been disclosed in Japanese Utility-Model Application Publication No. 59-31291 and another one has been disclosed in Japanese Patent Application Laid-Open No. 8-24518. The filter unit disclosed in Japanese Utility-Model Application Publication No. 59-31291 has a structure such that a washing machine provided individually from the main body of the filter press is moved along the filter plate lines to sequentially wash filter clothes each of which is put on the filter plate. The filter unit disclosed in Japanese Patent Application Laid-Open No. 8-24518 has a washing pipe provided for each cloth put on each filter plate to simultaneously wash the filter clothes each of which is disposed between the filter plates.

However, the washing unit disclosed in Japanese Utility-Model Application Publication No. 59-31291, having the structure such that the filter plates are opened one by one to wash the filter clothes each of which is disposed between the filter plates, involves an incidental time (a period in which the intended sold-liquid separation is not performed by a batch type filter of the foregoing type) being elongated unintentionally. Therefore, there arises a problem in that the filter suffers form an unsatisfactory operation rate. Although the filter unit disclosed in Japanese Patent Application Laid-Open No. 8-24518 is able to solve the above-mentioned problem because the filter clothes can simultaneously be washed, there arises a problem in that the maintenance including inspection and change of the filter clothes cannot easily be performed because the washing pipe is disposed above the filter clothes put on the filter plates.

SUMMARY OF THE INVENTION

The present invention is capable of overcoming the foregoing problems and intended to easily assemble a filter press and performing maintenance by forming main portions of the filter unit of the filter press into a filter unit. That is, a filter unit for a filter press according to the present invention comprises a plurality of filter plates movably and in parallel mounted on a pair of horizontal guide rails provided for a main body of the filter press and connected to one another so as to be opened and closed simultaneously; filtering surfaces formed on the right and reverse sides of each of the filter plates so as to form filtering chambers in association with adjacent filter plates when the filter plates are flattened; filter clothes each of which is put on the filtering surfaces on the right and reverse sides of each of the filter plates; an upper-portion support bar for supporting the upper portion of each of the filter clothes; support columns stood erect from two shoulder portions in the upper portion of each of the filter plates; a washing pipe extending above the filter plates to run in the direction of the filtering surfaces and having support-bar holding portions, to which the upper-portion support bar is supported, and inserted into the support columns so as to be supported by the support columns; nozzles provided for the washing pipe so as to spray washing water to the filter clothes; and a flexible pipe for detachably connecting a main supply pipe extending in the direction of the filter plates and the washing pipe to each other so as to supply washing water from the main supply pipe to the washing pipe in a state where the main supply pipe and the washing pipe are connected to each other.

To form the filter press by mounting the filter units on the main body of the filter press, the filter units are disposed on the guide rails of the main body of the filter press. Then, the filter plates are connected to one another, and then the washing pipes are, through flexible pipes, connected to the main supply pipe for washing water provided for the main body of the filter press.

When the filter plates of the filter units mounted on the main body of the filter press are closed, each of the filtering chambers is formed between the filter plates. In each of the filtering chambers, a pair of the filter clothes cover the filtering surface. When an undiluted solution intended to be filtered is, under pressure, injected into the filtering chamber, the filtering process is performed by the filter clothes. Thus, cakes can be left in the filtering chambers each of which is formed between filter clothes. A portion of the cakes, which cannot easily be separated, falls due to the dead weight by opening the filter plates to open the filtering chamber. Therefore, the portion of the cakes can easily be discharged to the outside of the filter press.

If the filter clothes are clogged after the filtering operation has continuously been performed, or if the cakes cannot smoothly be separated and thus the cakes are left on the surfaces of the filter clothes even after the filter plates have been opened, washing water is sprayed from the nozzles of the washing pipes to wash the filter clothes. The operation for washing the filter clothes is performed by simultaneously opening the filtering chambers by opening the filter plates. Since the washing pipe and the nozzles are provided for each filtering chamber, the washing operation can efficiently be performed. Since the filter cloth and the washing pipe are integrally formed, the relative positions between the two elements can be maintained even if the filter plate is opened or closed. Therefore, washing water can accurately be sprayed to the surface of the filter cloth. Thus, the filter clothes can sufficiently and accurately be washed with water.

Since the washing pipes and so forth are formed above the filter plates in such a manner that they are integrated with the filter plates and therefore they are not positioned above the filtering chambers which have been opened when the filter plates have been opened, the maintenance operation for changing the filter clothes and adjustment of the nozzles can easily be performed without obstruction of the washing pipe and so forth.

As described above, according to the present invention, the filter press can be formed by only mounting the filter unit on the main body of the filter press. Therefore, assembling, inspection and maintenance can easily be performed. Since the filter clothes and the unit for regenerating the filter clothes are integrally formed such that all of the filter clothes are enabled to simultaneously be regenerated, regeneration of the filter clothes can accurately and quickly be performed. Thus, the operation rate of the batch type filter press can be improved.

Another structure may be employed in which the washing pipe is elastically supported by the support columns through springs and has two ends which are extended over the support columns and with which a vibration rod disposed on the outside of the main body of the filter press is brought into contact from a lower position and from which the vibration rod is separated downwards.

The foregoing structure enables the vibration rod to efficiently vibrate the filter clothes through the washing pipe and the upper portion support bar if cakes, which cannot easily be separated, are left. In particular, the filter clothes can be regenerated without washing water.

Another structure may be employed in which each of the filter clothes has, at the upper end thereof, a bag portion into which the upper portion support bar is inserted and a weight at the lower end thereof, the support-bar holding portions are stoppers stood erect opposite to each other to respectively face the side surfaces of the washing pipe to hold the upper portion support bar inserted into the bag portions in a state where the filter clothes are hung on the filtering surfaces on the right and reverse sides of the filter plates, each of the support-bar holding portions having clip insertion holes in the upper end thereof, and two ends of a substantially U-shape clip formed to downwards cover the two stoppers are detachably inserted into the clip insertion holes.

According to the foregoing structure, when the filter clothes are attached to the washing pipes, the upper-portion support bars are required to be disposed to face the side surfaces of the washing pipes so as to be held by the stoppers stood erect. Then, the filter clothes are hung to face the right and reverse sides of the filter plates and the weights are attached to the lower ends of the filter clothes. Moreover, the U-shape clip is inserted into the retaining holes formed at the top end of the stopper. Thus, the filter clothes can easily and reliably be attached in such a manner that separation can completely be prevented by the clips when filter clothes are vibrated.

DESCRIPTION OF THE PREFERRED EMBODIMENTS

Embodiments of the present invention will now be described with reference to the drawings.

Figure 1:
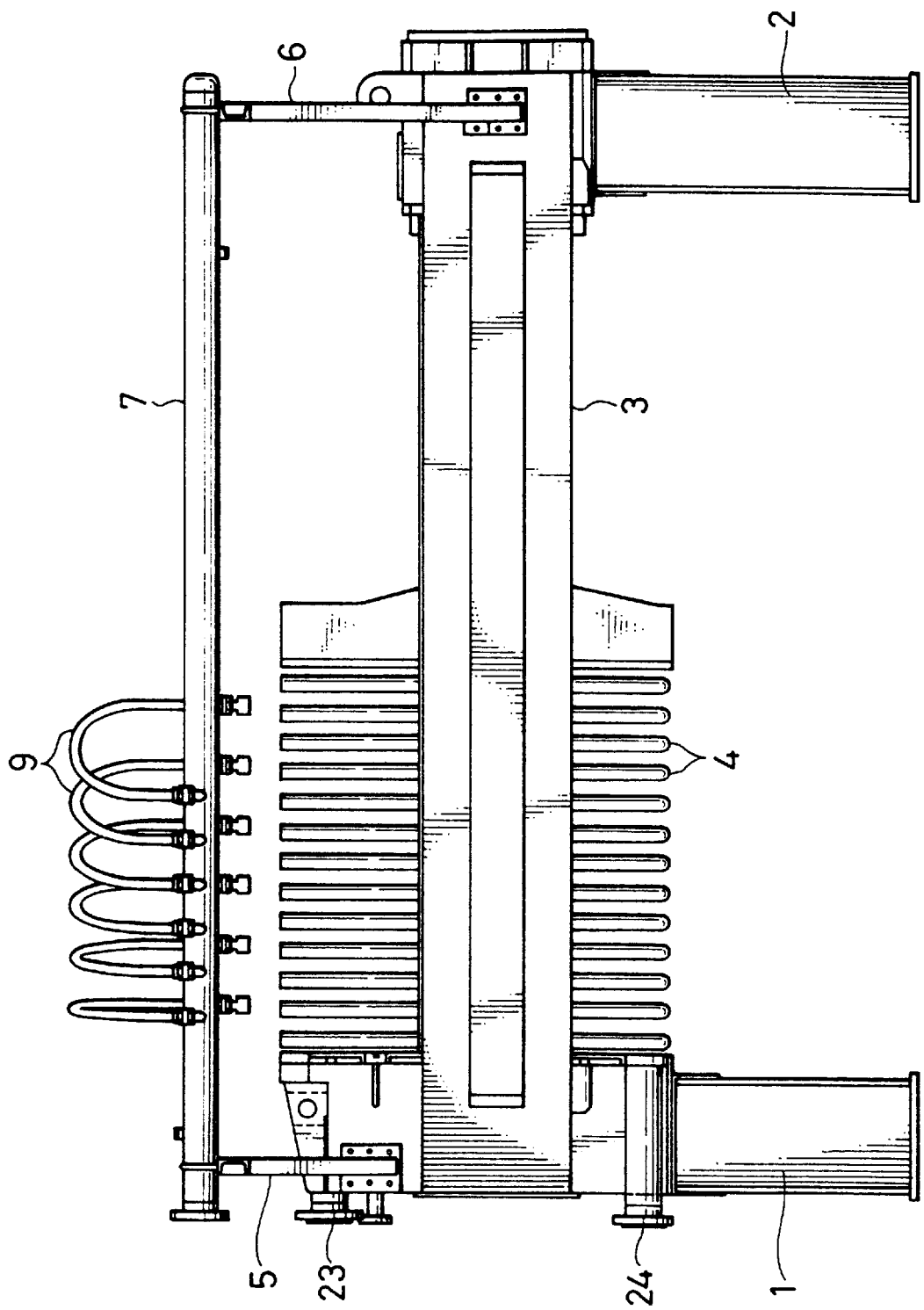
FIG. 1 is a side view schematically showing a filter press having filter units according to an embodiment of the present invention.
Figure 2:
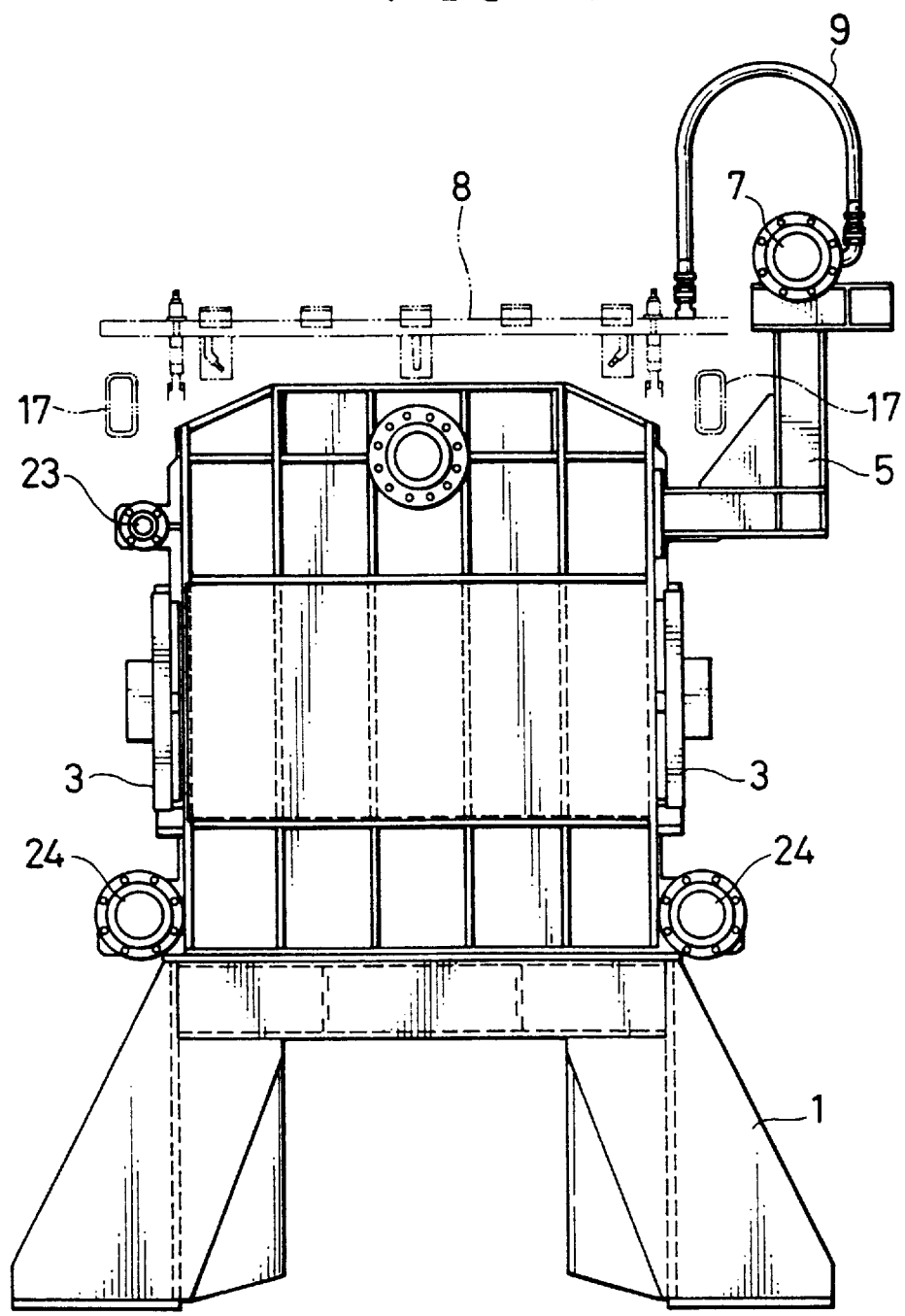
FIG. 2 is a left side view of FIG. 1.

FIG. 1 is a side view schematically showing a filter press having a filter unit according to an embodiment of the present invention. FIG. 2 is a left side view of FIG. 1, and FIG. 3 is a right side view of FIG. 1.

The main body of the filter press has a left frame 1 and a right frame 2 respectively disposed at the right and left positions of FIG. 1, a pair of guide rails 3 disposed between the right and left frames 1 and 2 and horizontally extending to the opposite right and left positions of FIG. 2, an undiluted-solution supply pipe line 23, a filtrate discharge pipe line 24 and an opening/closing clamping mechanism (not shown).

A plurality of filter units are mounted on the guide rails 3, each filter unit having a filter plate 4 having filtering surface 4a formed on each of the right and reverse sides thereof, a filter cloth 13 put on the filtering surface 4a, a washing pipe 8 formed integrally with the upper portion of the filter plate 4 and having a plurality of nozzles 8a. Thus, a plurality of the filter plates 4 are, while being made movable, disposed in parallel on the guide rails 3. The filter plates 4 are connected to each other by a flexible member such as a chain (not shown) so as to be opened or closed simultaneously and apart form each other at the same intervals (refer to FIGS. 4 and 5). Note that the filter plates 4 are opened or closed by, in parallel, moving the outermost filter plate 4 by an opening/closing clamping mechanism (not shown).

Figure 3:
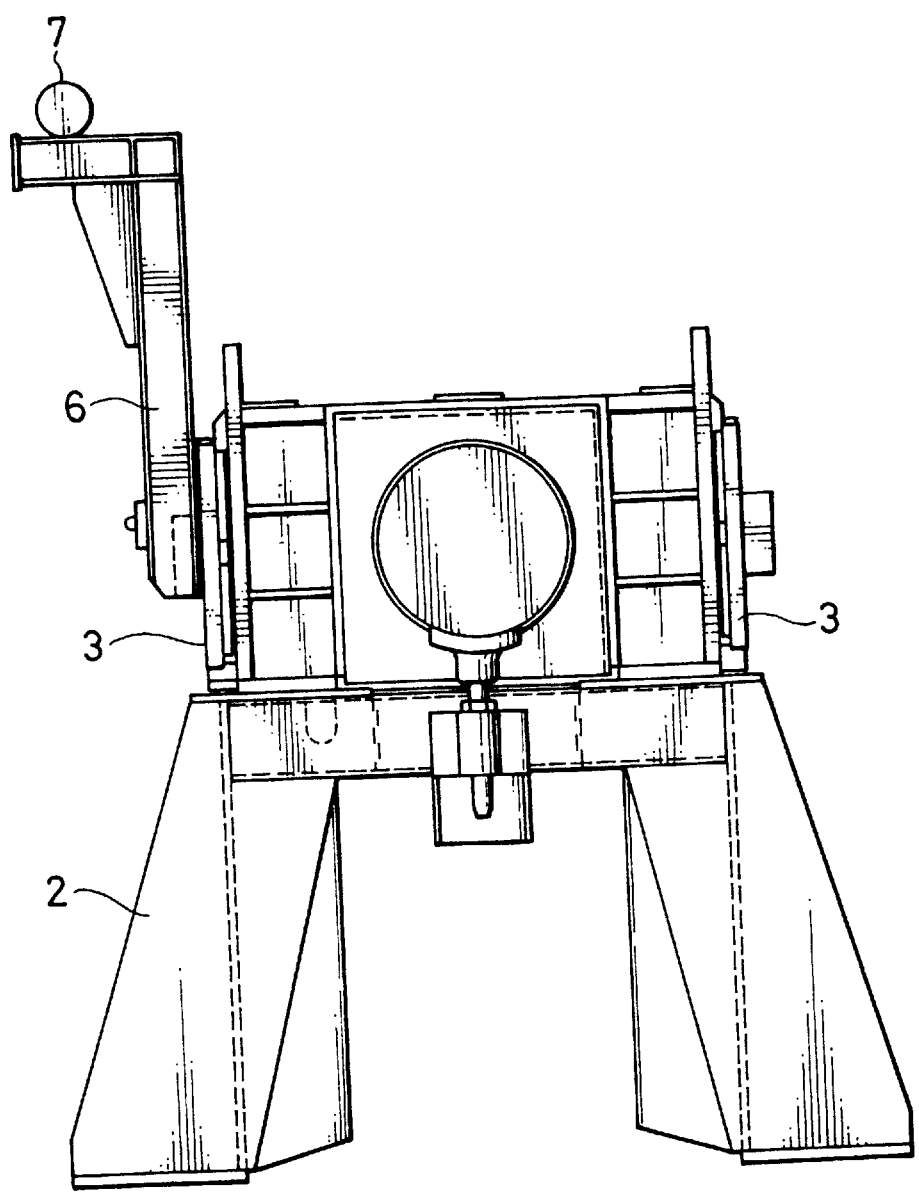
FIG. 3 is a right side view of FIG. 1.

As shown in FIGS. 2 and 3, stays 5 and 6 are stood erect respectively in the upper portions of each end of the right and left frames 1 and 2. A main washing water pipe 7 is arranged between the stays 5 and 6.

The filter unit will now be described with reference to FIGS. 4 to 11.

Figure 4:
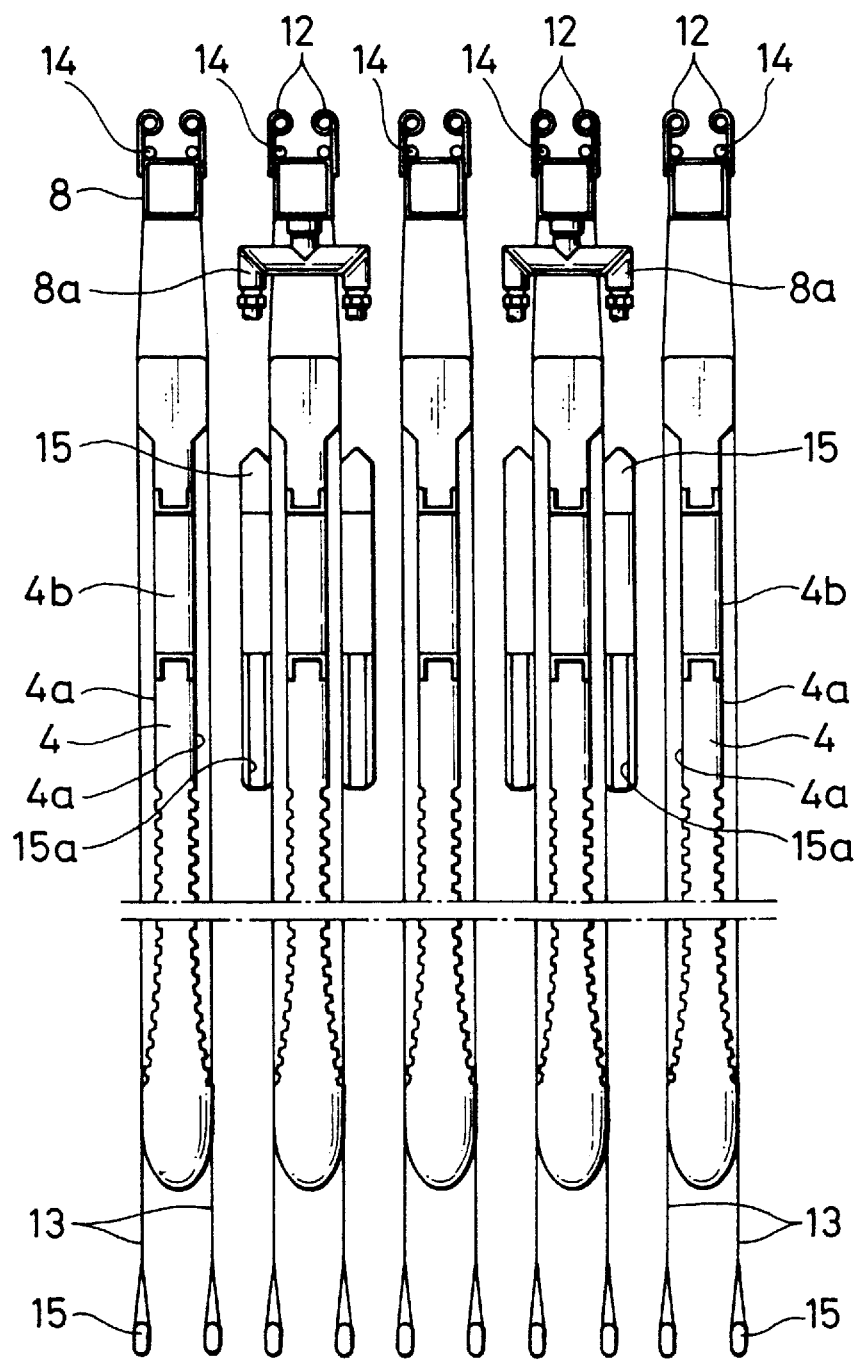
FIG. 4 is a vertical cross sectional view showing a state where a portion of filter plates are disposed in parallel in a state where the filter plates are opened.
Figure 7:
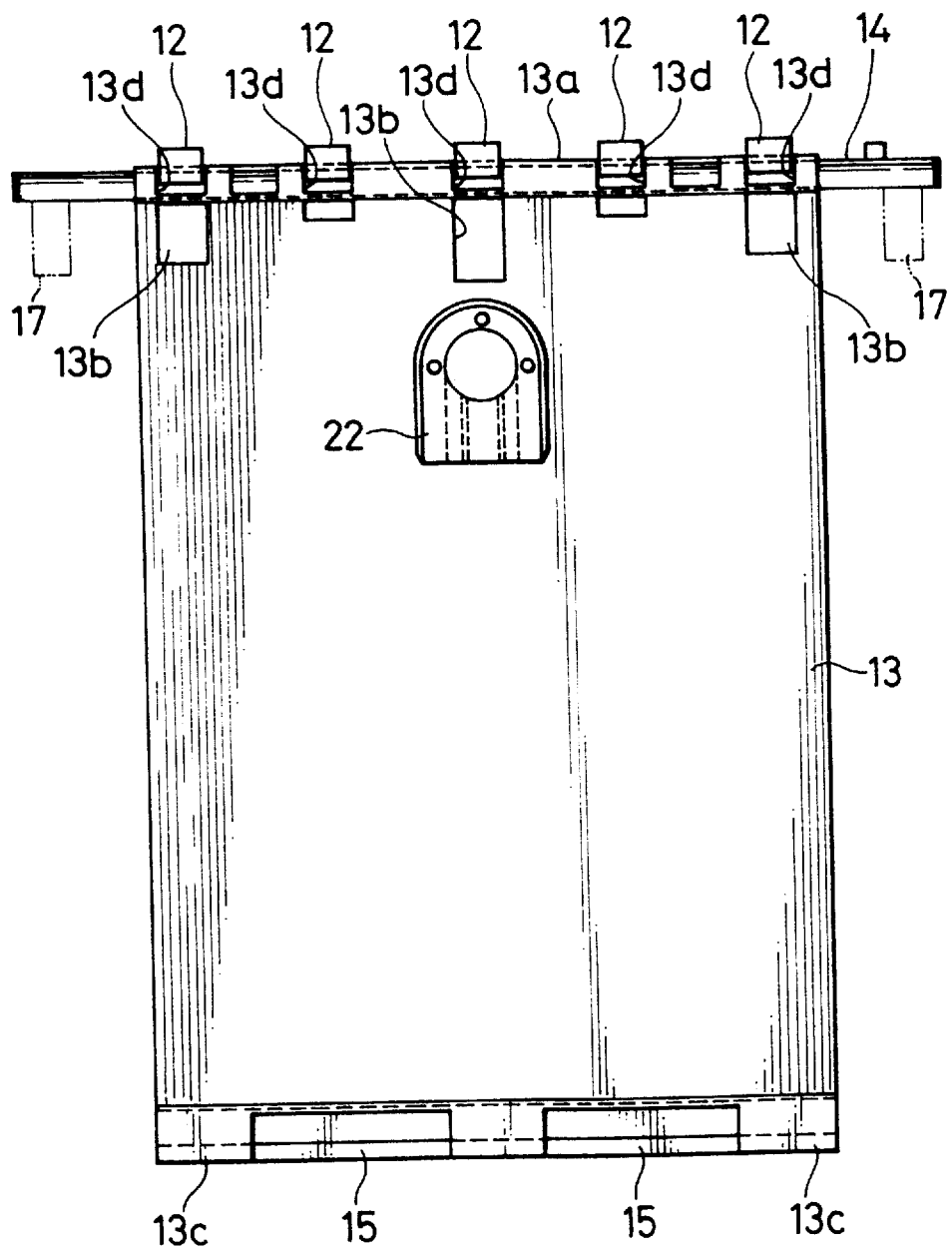
FIG. 7 is a front view of the filter cloth shown in FIG. 6.
Figure 8:
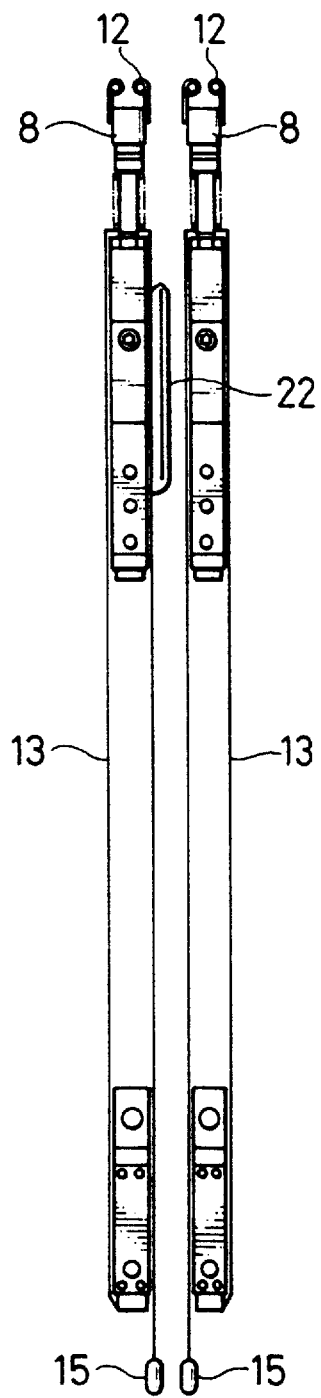
FIG. 8 is a left side view of FIG. 7 explaining a state where the clothes are hung.
Figure 9:
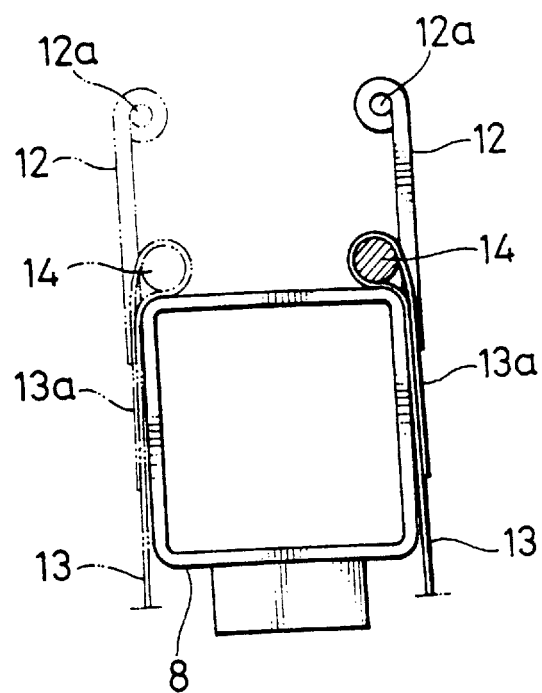
FIG. 9 is an enlarged side view of a portion of FIG. 7 showing a state where the top end of the filter cloth is attached.
Figure 10:
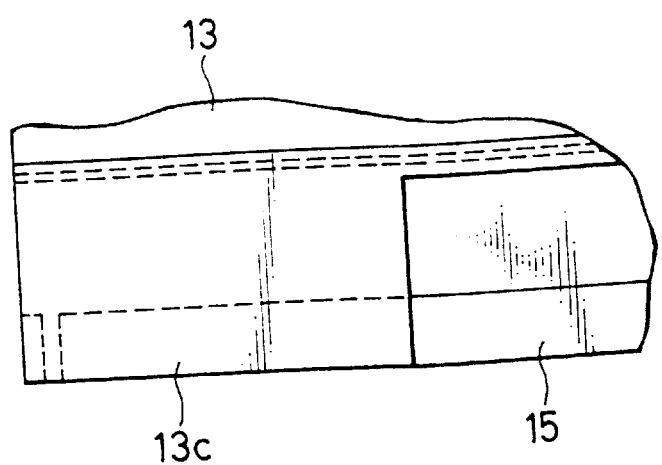
FIG. 10 is an enlarged front view showing a portion of the lower end of the filter cloth in which a state where a weight is attached to the filter cloth is shown.
Figure 11:
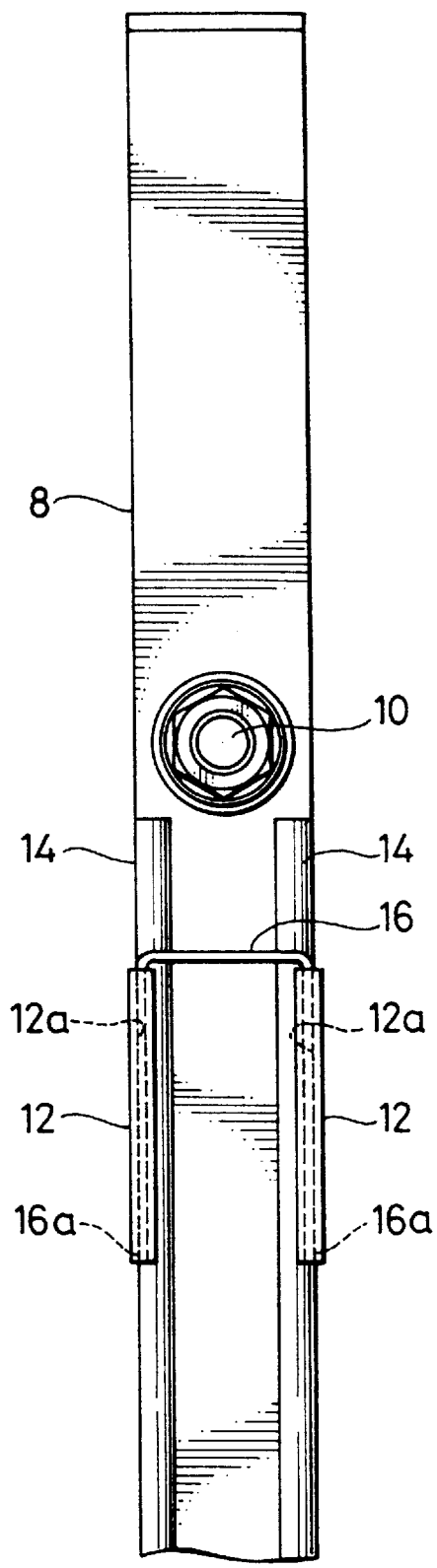
FIG. 11 is a plan view showing a stopper portion showing a state of attachment of an upper bar for the cloth.

As shown in FIG. 4, each of the filter plates 4 has concave filtering surface 4a on each of the right and reverse sides thereof. The filtering surfaces 4a form filtering chambers with adjacent and opposite filtering surfaces when the filter plates 4 are flattened (see FIG. 5). The filter cloth 13 is put on each of the filtering surfaces 4a on the right and reverse sides of the filter plate 4. The upper portion of the filter cloth 13 is supported by an upper-portion support bar 14. As shown in FIG. 7, the filter cloth 13 has bag portions 13a and 13c at the upper and lower ends thereof. An upper-portion support bar 14 is inserted into the upper bag portion 13a, while a weight 15 for applying tension to the filter cloth 13 is inserted into the lower bag portion 13c.

Figure 6:
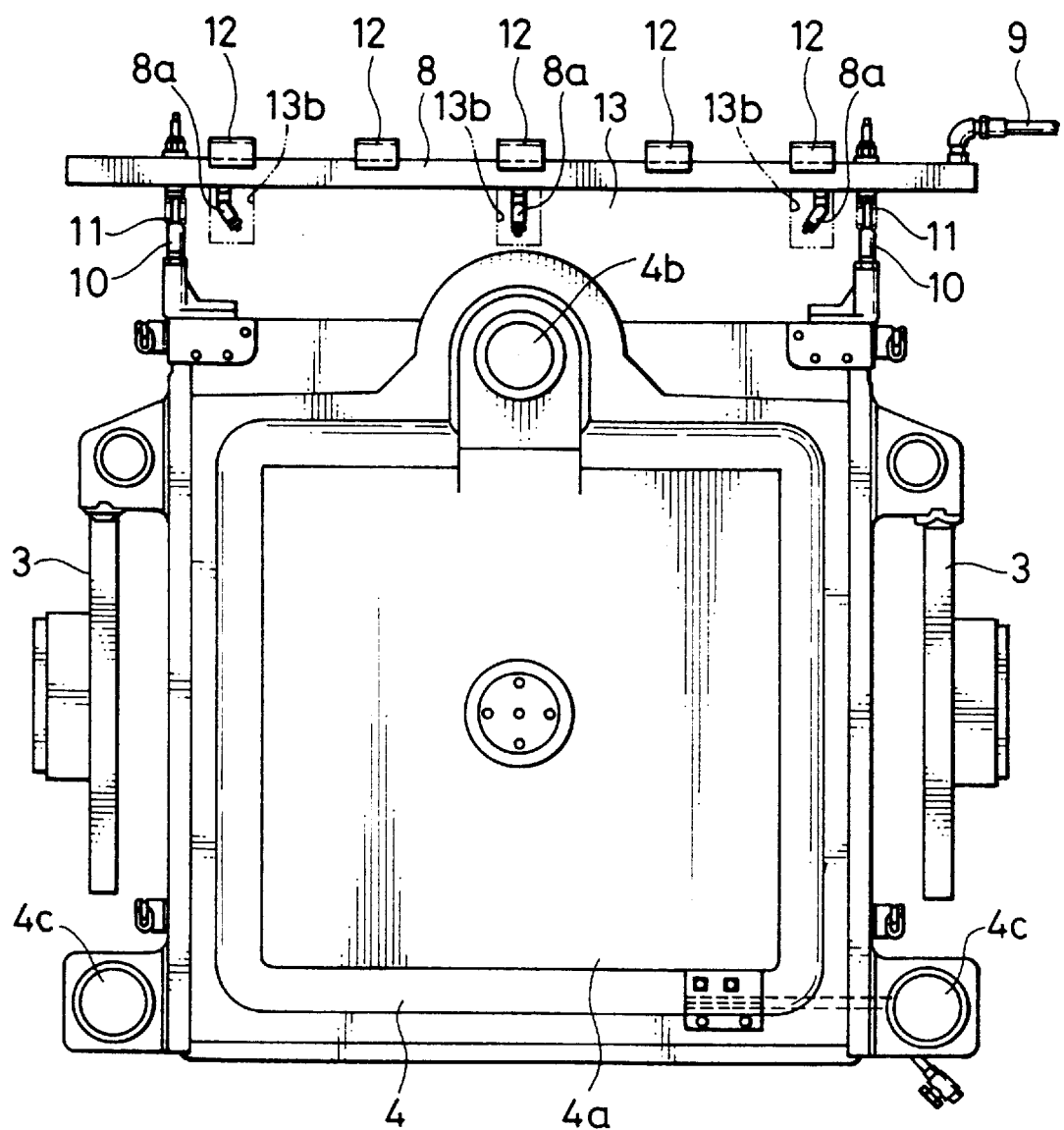
FIG. 6 is a front view of the filter unit shown in FIG. 1.

As shown in FIG. 6, support columns 10 are stood erect on the two shoulder portions in the upper portions of the right and left portions of the filter plate 4. The support columns 10 support the washing pipe 8 having a square shape such that the washing pipe 8 is inserted into the support columns 10. A spring 11 is disposed around the lower portion of each of the support columns 10 so that the spring 11 causes the washing pipe 8 to be elastically supported by the support column 10. Each washing pipe 8 and the main washing water pipe 7 are separably connected to each other by a flexible pipe 9 (see FIG. 2). The flexible pipe 9 is disposed upper and outer than either shoulder of the filter plate 4 so as to hold the communication between the main washing water pipe 7 and each washing pipe 8 so that washing water is allowed to flow from the main washing water pipe 7 to each of the washing pipes 8.

A stopper 12 serving as a support-bar holding portion is secured to each of the front and rear surfaces of the washing pipe 8. The stopper 12 is, as shown in FIG. 7, stood erect to face the side surface of the washing pipe 8 to hold the upper-portion support bar 14 inserted into the upper bag portion 13a in a state where the filter cloth 13 is hung to cover the filtering surface 4a on each of the right and reverse sides of the filter plate 4 (see FIG. 9). Cut-out windows 13d and 13b are respectively formed in the upper bag portion 13a of the filter cloth 13 at positions which respectively are brought into contact with the stopper 12 and the nozzle 8a provided for the washing pipe 8.

Figure 5:
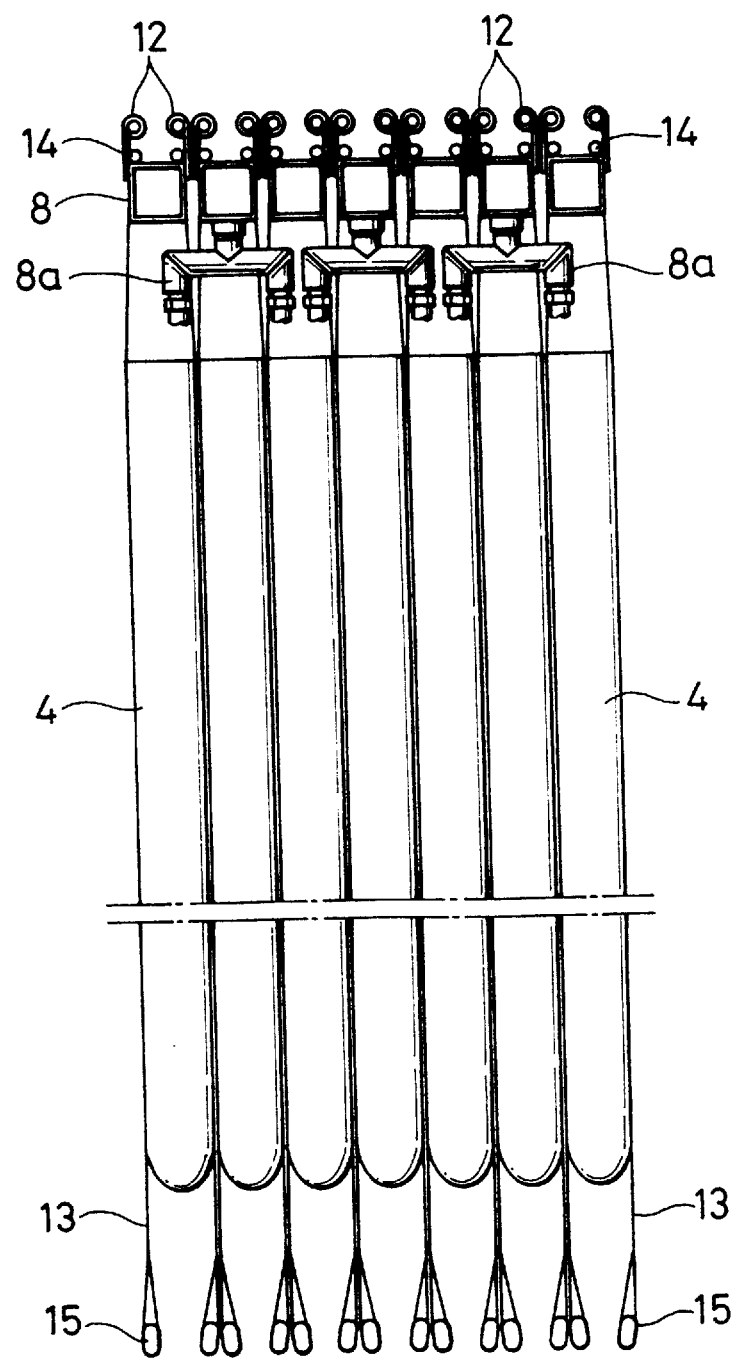
FIG. 5 is a vertical cross sectional view showing a state where a portion of filter plates is disposed in parallel in a state where the filter plates are closed.

As shown in FIGS. 4 and 5, the nozzles 8a are branched into two sections and disposed to face the surface of the filter cloth 13 on each of the two sides (the right and reverse sides) of the filter plate 4.

As shown in FIG. 6, the filter plate 4 has, in the upper portion thereof, an undiluted-solution supply hole 4b allowed to communicate with the undiluted-solution supply pipe line 23 in a state where the filter plates 4 are opened. Moreover, filtrate discharge holes 4c allowed to communicate with the filtrate discharge pipe line 24 when the filter plate 4 are opened, are formed in the lower portion of the right and left portions of the filter plate 4. As shown in FIG. 7, a solution supply plate 22 is formed in the central portion of the upper portion of the filter cloth 13 to correspond to the undiluted-solution supply holes 4b formed in the filter plate 4. Thus, the undiluted solution is supplied from the undiluted-solution supply pipe line 23 to a filtering chamber through the undiluted-solution supply holes 4b and the solution supply plate 22. The filtrate is discharged to a filtrate discharge pipe line 24 from the filtering chamber through a waste solution passage (not shown) and a filtrate discharge hole 4c.

Figure 12:
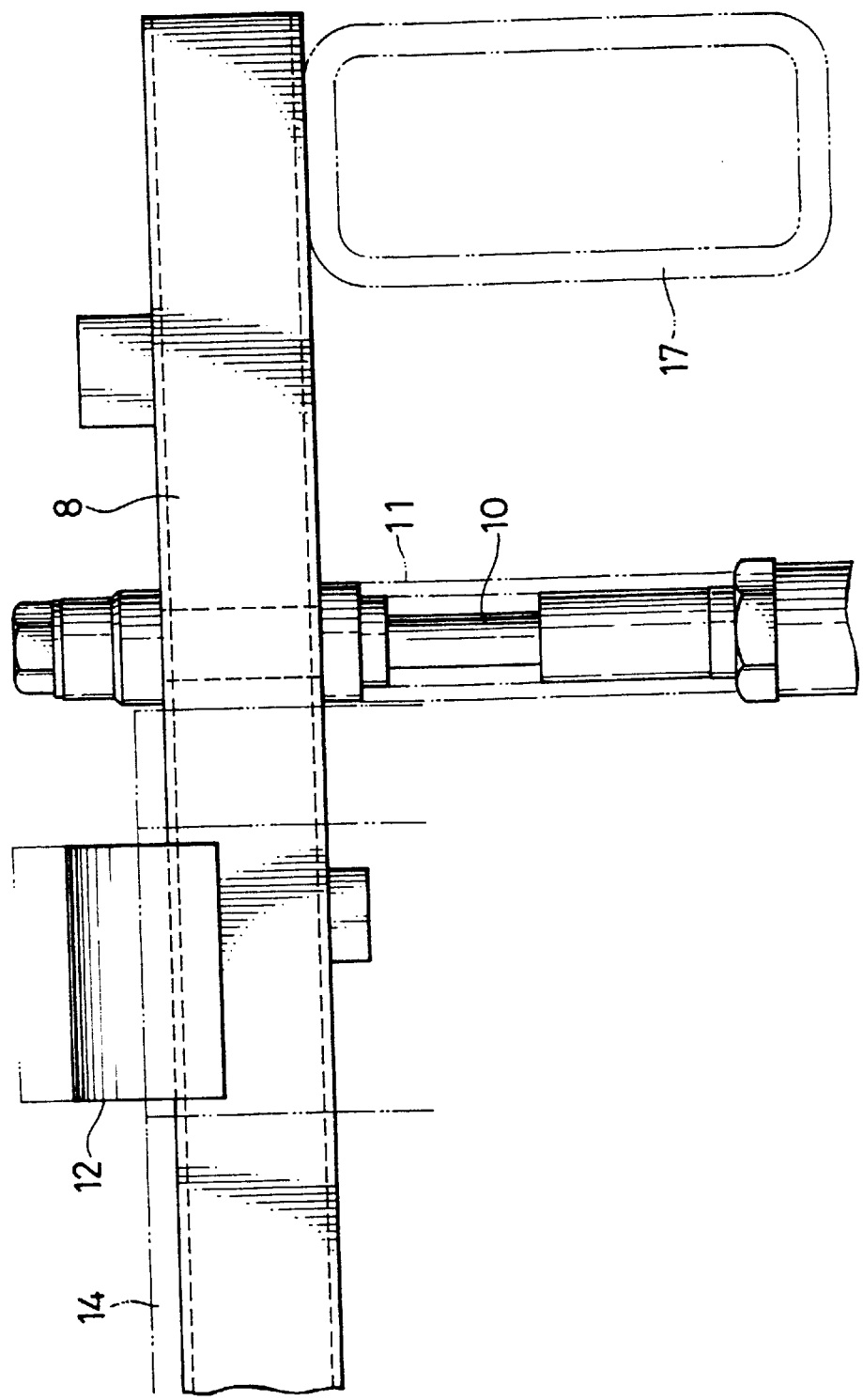
FIG. 12 is a front view of FIG. 11.
Figure 13:
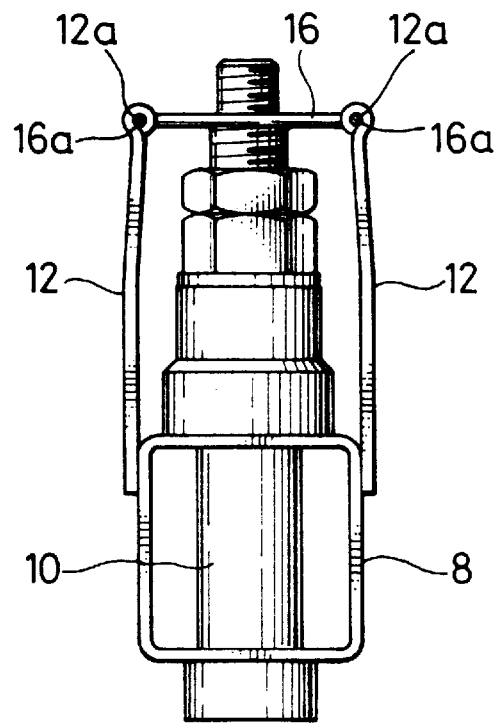
FIG. 13 is right side view of FIG. 12.
Figure 14:
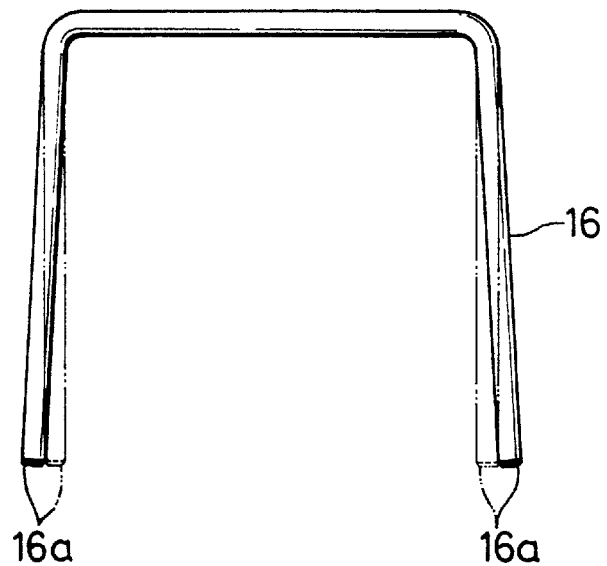
FIG. 14 is a plan view showing a clip for preventing separation of the upper bar for the filter cloth.
Figure 15:
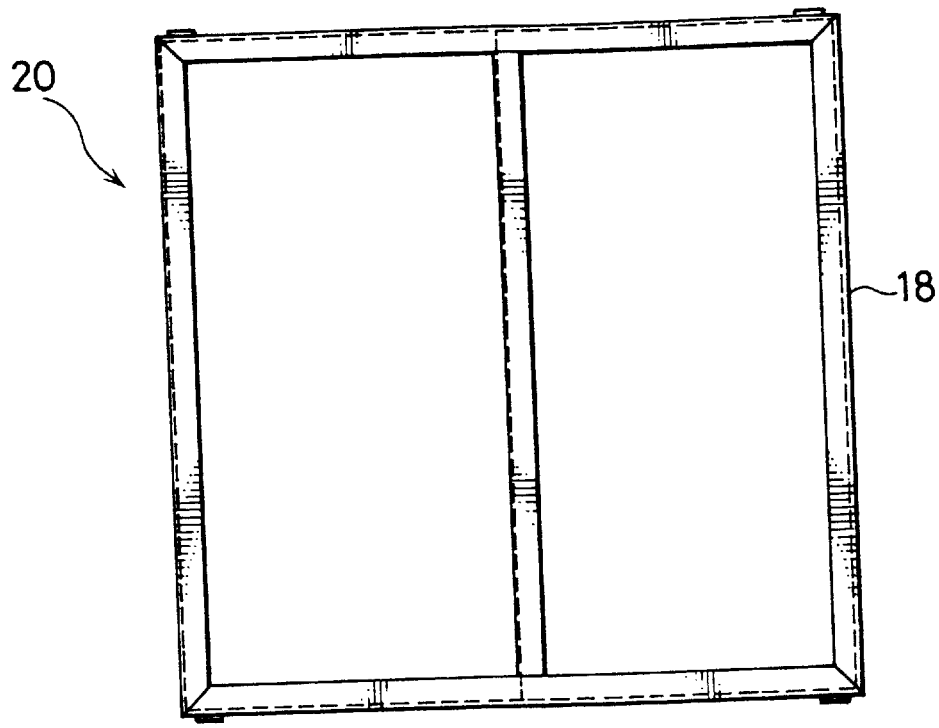
FIG. 15 is a plan view showing a jig for attaching the filter cloth to the filter plate.
Figure 16:
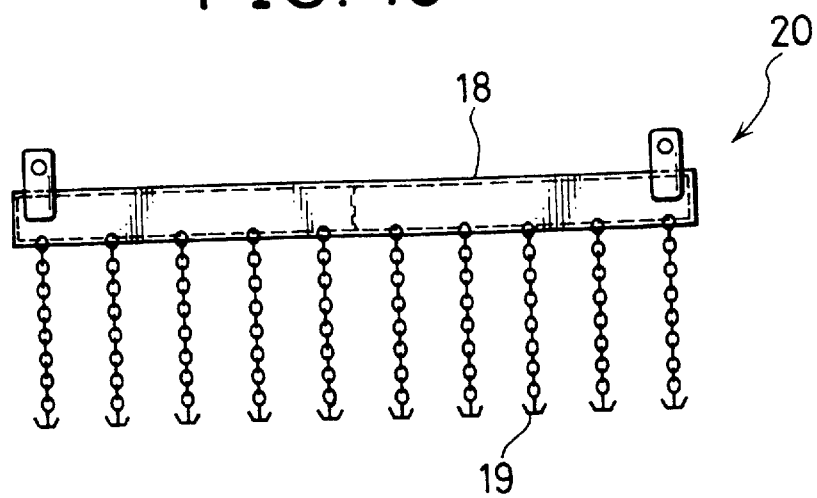
FIG. 16 is a side view of FIG. 15.

As shown in FIGS. 7 and 12, the washing pipe 8 has two ends extending outwards over the support column 10. Vibration rods 17 provided for the main body of the filter press are brought into contact with the two ends and separated from the same so that the filter cloth 13 is vibrated mainly in the vertical direction. A pair of the vibration rod 17 are provided for the main body of the filter press and vibrated vertically so as to be brought into contact with the lower surface of the washing pipe 8 and separated from the same.

FIGS. 12 to 15 are diagrams showing the detailed structure of a portion of the filter cloth 13 which is attached to the washing pipe 8. Retaining holes 12a, through which a clip 16 is inserted, are formed at the top ends of the stoppers 12 respectively provided for the front and rear surfaces of the washing pipe 8. The retaining hole 12a is formed into a cylindrical shape by rounding the top end of the stopper 12. Leading ends 16a of the U-shape clip 16 are inserted into the retaining holes 12a of the opposite stoppers 12. The clip 16 is provided for the purpose of preventing jump and separation of the upper-portion support bar 14 of the filter cloth 13 attached to the stopper 12 when the filter cloth 13 is vibrated.

When the filter cloth 13 is attached to the washing pipe 8, a jig 20 structured as shown in FIGS. 15 to 18 may be employed. The jig 20 has a suspended frame 18 formed into a rectangular shape having one side which is substantially the same as the width of the filter cloth 13; and a plurality of anchor-like hooks 19 disposed on the opposite sides of the suspended frame 18. The jig 20 according to this embodiment has ten (twenty on the two sides) hooks 19 on one side thereof to simultaneously hang ten pairs of filter clothes 13.

Figure 17A:
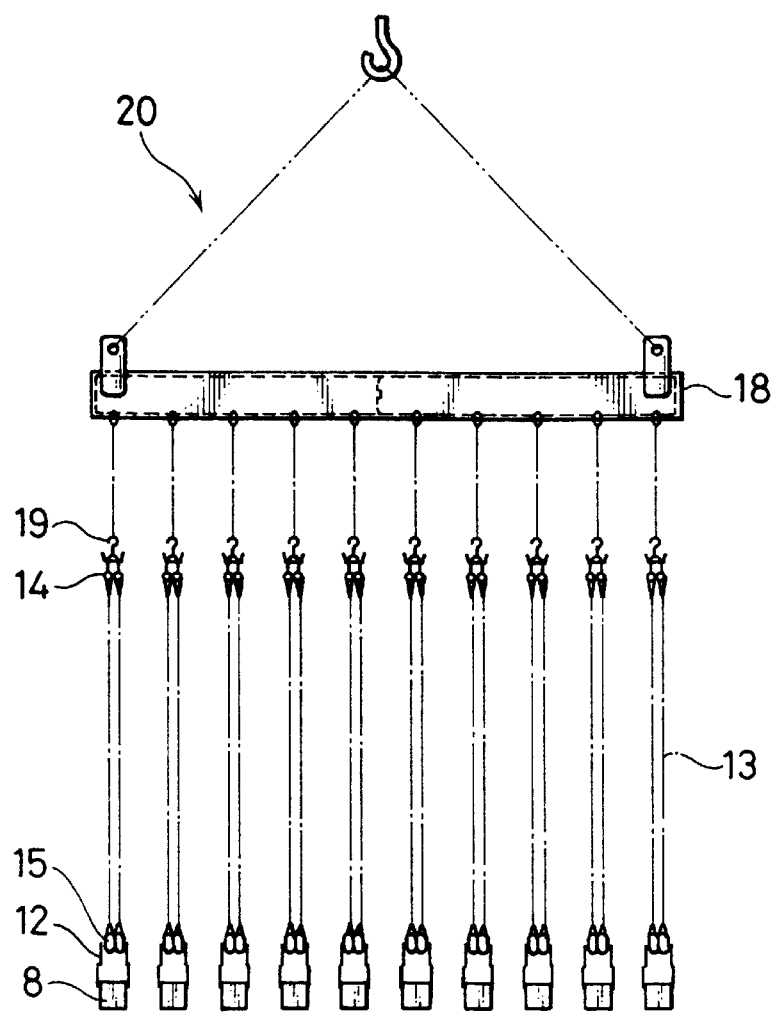
FIG. 17A is a side view showing a state before the filter cloth is attached to the filter plate by using the jig shown in FIG. 15.
Figure 17B:
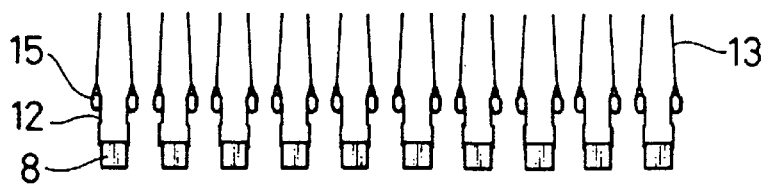
FIG. 17B is a side view showing a state during the filter cloth is being attached to the filter plate by using the jig shown in FIG. 15.
Figure 17C:
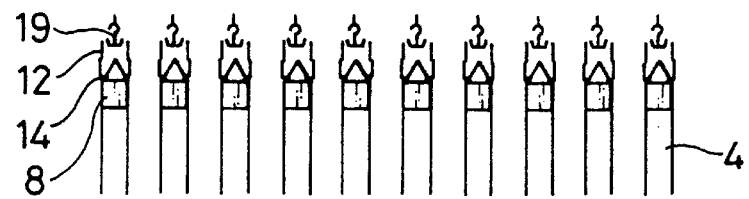
FIG. 17C is a side view showing a state after the filter cloth has been attached to the filter plate by using the jig shown in FIG. 15.
Figure 18:
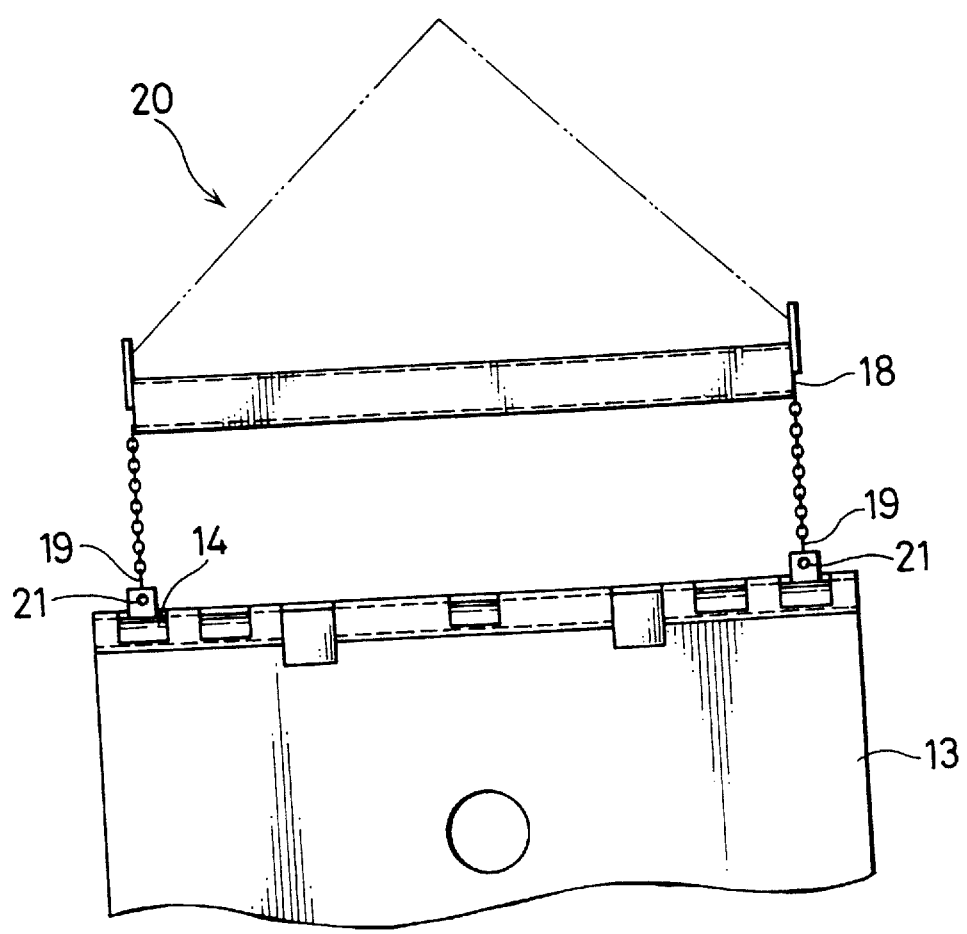
FIG. 18 is a front view showing a state where the filter cloth is hung by the jig shown in FIG. 15.

As shown in FIGS. 17A and 18, the suspended frame 18 is suspended by a crane or the like so as to be capable of moving vertically. When the attachment holes 21 formed at the two ends of the upper-portion support bar 14 of the filter cloth 13 are hooked by each hooks 19, a plurality of filter clothes 13 are suspended from the suspended frame 18. As shown in FIGS. 17B and 17C, the suspended frame 18 is located in such a manner that the pair of filter clothes 13 are placed to respectively face both of the right and reverse sides of each filter plate 4 at a position above the washing pipe 8 above the filter plate 4 stood erect at a predetermined opening pitch. Then, the suspended frame 18 is moved downwards. As a result, the plural filter clothes 13 are simultaneously moved to required positions on the right and reverse sides of the filter plate 4. As a result, the operation for attaching the filter clothes 13 to the washing pipes 8 can easily be performed. The above-mentioned jig 20 can be used to attach the filter clothes 13 when the filter press is manufactured, to again attach the removed clothes 13 and to remove the filter clothes 13. In particular, the jig 20 is effective in facilitating the maintenance such as change of the filter clothes 13.

When the filter unit is mounted on the main body of the filter press to form the filter press, the filter unit is disposed on the guide rails 3. Then, the filter plates 4 are connected to one another, and then each washing pipe 8 is, through the flexible pipe 9, connected to the main washing water pipe 7. Hitherto, a filter press of the conventional type is assembled, the filter plates 4, the filter clothes 13 and the unit for washing the filter clothes 13 have been individually attached to the body of the filter press. However, according to this embodiment, the foregoing main portions are simultaneously attached as a unit. Therefore, the assembling operation can quickly and easily be performed. By mounting the filter units on the main body of the filter press by a required number, the filtering mechanism portion of the filter press can easily be formed.

When each of the filter plate 4 mounted on the main body of the filter press is closed, each of the filtering chamber can be formed between filter plates 4. In each filtering chamber, the filtering surface 4a is covered with the pair of the filter clothes 13. Therefore, when the undiluted solution to be filtered is, under pressure, injected into the filtering chamber, the filtering operation is performed by the filter clothes 13. As a result, cakes can be left in each of the filtering chamber formed between the filter clothes 13. Since a portion of the cakes, which can easily be separated, falls due to the dead weights by opening the filter plates 4 to open the filtering chambers, such cakes can easily be discharged to the outside of the filter press to regenerate the filter. Since all of the filter plates 4 are simultaneously opened, the above-mentioned regenerating operation can quickly be performed. Note that the cakes can furthermore be pressed by providing a diaphragm for the filter plate 4.

If the filter clothes 13 are clogged after the filtering operation has continuously been performed, or if the cakes cannot smoothly be separated and thus the cakes are left on the surfaces of the filter clothes 13 even after the filter plates 4 have been opened, washing water is sprayed from the nozzles 8a of the washing pipes 8 to wash the filter clothes 13. The operation for washing the filter clothes 13 is performed by simultaneously opening the filtering chambers by opening the filter plates 4. Since the washing pipe 8 and the nozzles 8a are provided for each filtering chamber, the washing operation can efficiently be performed. Since the filter cloth 13 and the washing pipe 8 are integrally formed, the relative positions between the two elements can be maintained even if the filter plate 4 is opened or closed. Therefore, washing water can accurately be sprayed to the surface of the filter cloth 13. Thus, the filter clothes 13 can sufficiently and accurately be washed with water.

Since the washing pipes 8 and the nozzles 8a are formed above the filter plates 4 in such a manner that they are integrated with the filter plates 4 and therefore they are not positioned above the filtering chambers which have been opened when the filter plates 4 have been opened, the maintenance operation for changing the filter clothes 13 and adjustment of the nozzles 8a can easily be performed without obstruction of the washing pipe 8 and so forth.

If cakes of a type which cannot easily be separated are left, the filter clothes 13 can efficiently be vibrated by the vibration rod 17 through the washing pipes 8 and the upper-portion support bars 14. In particular, the filter clothes 13 can be regenerated without use of washing water.

When the filter clothes 13 are attached to the washing pipes 8, the upper-portion support bars 14 are required to be disposed to face the side surfaces of the washing pipes 8 so as to be held by the stoppers 12 stood erect. Then, the filter clothes 13 are hung to face the right and reverse sides of the filter plates 4 and the weights 15 are attached to the lower ends of the filter clothes 13. Moreover, the U-shape clip 16 is inserted into the retaining holes 12a formed at the top end of the stopper 12. Thus, the filter clothes 13 can easily and reliably be attached in such a manner that separation can completely be prevented by the clips 16 when the filter clothes 13 are vibrated.

What is claimed is:

1. A filter unit detachably attached on a filter press, the filter press comprising a pair of horizontal parallel guide rails and a main supply pipe substantially parallel to the guide rails for supplying washing water, the filter unit comprising:

a plurality of filter plates adapted to be mounted movably and in parallel on the guide rails, each of the filter plates having a pair shoulder portions located at respective upper corners thereof, each of the filter plates including filtering surfaces formed on the opposite sides thereof, each pair of adjacent ones of said filter plates forming a respective filtering chamber between the respective filtering surfaces when the adjacent plates are closed;

a plurality of filter cloths, wherein each of the filter surfaces is covered by a respective said filter cloths;

a plurality of upper-portion support bars, wherein an upper portion of each of the filter cloths is connected to a respective one of said upper-portion support bars;

a plurality of support columns, wherein each said shoulder portion of the filter plates includes one of said support columns extending upwardly therefrom;

a plurality of pipe members, wherein each of the filter plates includes one of said pipe members, wherein each of said pipe members is horizontally disposed above a respective one of said filter plates and is substantially parallel to the filtering surfaces of the respective one of said filter plates, wherein each of the pipe members is supported by the support columns on the respective filter plate, and wherein each of the pipe members includes a support-bar holding portion for connecting the upper-portion support bars to a respective one of said pipe members;

a plurality of nozzles provided on each of the pipe members for spraying washing water onto the filter cloths adjacent thereto, wherein each of the nozzles is fluidly connected to receive washing water from a respective one of the pipe members by a respective connection means;

a plurality of flexible pipes, wherein each of the flexible pipes detachably connects a respective one of the pipe members with the main supply pipe so as to supply washing water from the main supply pipe to the pipe members.

2. A filter unit for a filter press according to claim 1, wherein the support-bar holding portion includes a pair of stoppers and a substantially U-shaped clip, the stoppers are stood erect opposite to each other on each of the pipe members and have clip insertion holes respectively, each of the filter clothes has a stopper through portion at the upper portion thereof and a weight at a lower end portion thereof, the upper-portion support bars are engaged with the stoppers when the filter clothes are hung on the filtering surfaces and the stoppers pass through the stopper through portions, and the clip connecting between the stoppers and thereby preventing the upper-portion support bars from being detached from the stoppers when two ends of the clip are inserted into the clip insertion holes.

3. A filter unit detachably attached on a filter press, the filter press comprising a pair of horizontal parallel guide rails, a main supply pipe substantially parallel to the guide rails for supplying washing water, a pair of vibration rods substantially parallel to the guide rails, the filter unit comprising:

a plurality of filter plates adapted to be movably and in parallel mounted on the guide rails between the vibration rods, each of the filter plates having a pair shoulder portions located at respective upper corners thereof, each of the filter plates including filtering surfaces formed on the opposite vertical sides thereof, each pair of adjacent ones of said filter plates forming a respective filtering chamber between the respective filtering surfaces when the adjacent plates are closed;

a plurality of filter cloths, wherein each of the filter surfaces is covered by a respective one of said filter cloths;

a plurality of upper-portion support bars, wherein an upper portion of each of the filter cloths is connected to a respective one of said upper-portion support bars;

a plurality of support columns, wherein each said shoulder portion of the filter plates includes one of said support columns extending upwardly therefrom;

a plurality of pipe members, wherein each of the filter plates includes one of said pipe members, wherein each of said pipe members is horizontally disposed above the respective one of said filter plates and is substantially parallel to the filtering surfaces of the respective one of said filter plates, wherein each of the pipe members is mounted on the support columns of a respective one of said filter plates and is elastically supported on each of the support columns by a respective spring means, and wherein each of the pipe members includes a support-bar holding portion for connecting the upper-portion support bars to the respective one of said pipe members, each of the pipe members having two ends extending out of the support columns that are adapted to be brought into contact with said vibration rod;

a plurality of nozzles provided on each of the pipe members for spraying washing water onto the filter cloths adjacent thereto, wherein each of the nozzles is fluidly connected to receive washing water from a respective one of the pipe members by a respective connection means;

a plurality of flexible pipes, wherein each of the flexible pipes detachably connects a respective one of the pipe members with the main supply pipe so as to supply washing water from the main supply pipe to the pipe members.

4. A filter unit for a filter press according to claim 3, wherein the support-bar holding portion includes a pair of stoppers and a substantially U-shaped clip, the stoppers are stood erect opposite to each other on each of the pipe members and have clip insertion holes respectively, each of the filter clothes has a stopper through portion at the upper portion thereof and a weight at a lower end portion thereof, the upper-portion support bars are engaged with the stoppers when the filter clothes are hung on the filtering surfaces and the stoppers pass through the stopper through portions, and the clip connects between the stoppers and prevents the upper-portion support bars from being detached from the stoppers as two ends of the clip are inserted into the clip insertion holes.

\* \* \* \* \*